(12) United States Patent
Fuller et al.

(10) Patent No.: US 8,178,224 B2
(45) Date of Patent: May 15, 2012

(54) SULFONATED POLYELECTROLYTE MEMBRANES CONTAINING PERFLUOROSULFONATE IONOMERS

(75) Inventors: Timothy J. Fuller, Pittsford, NY (US); Beba T. Dobulis, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2037 days.

(21) Appl. No.: 11/053,714

(22) Filed: Feb. 8, 2005

(65) Prior Publication Data
US 2006/0177719 A1    Aug. 10, 2006

(51) Int. Cl.
*H01M 8/10*    (2006.01)
(52) U.S. Cl. ............... 429/12; 429/479; 429/492
(58) Field of Classification Search .................. None
See application file for complete search history.

(56) References Cited

U.S. PATENT DOCUMENTS

| | | | |
|---|---|---|---|
| 3,919,177 A | 11/1975 | Campbell | |
| 4,335,059 A | 6/1982 | Rizkalla | |
| 5,625,002 A | 4/1997 | Kadoi et al. | |
| 6,248,469 B1 * | 6/2001 | Formato et al. | 429/41 |
| 6,462,095 B1 | 10/2002 | Bonsel et al. | |
| 6,753,392 B1 | 6/2004 | Petrova et al. | |
| 2004/0072045 A1 | 4/2004 | Kuromatsu et al. | |
| 2004/0241522 A1 * | 12/2004 | Ono et al. | 429/34 |
| 2005/0130006 A1 * | 6/2005 | Hoshi et al. | 429/30 |

OTHER PUBLICATIONS

Product Information, "Nation® PFSA Polymer Dispersions DE 520/521, DE 1020/10/21, DE 2020/2021, Perfluorosulfonic acid polymer", DuPont, Undated.

* cited by examiner

*Primary Examiner* — Ula C. Ruddock
*Assistant Examiner* — A. Echelmeyer

(57) ABSTRACT

New proton conducting membranes are made of sulfonated poly(arylene sulfide) polymers (SPAS) and a perfluorosulfonic acid polymer. A preferred poly(arylene sulfide) polymer is poly(p-phenylene sulfide). The membranes are used as a proton exchange membrane in PEM fuel cells operating at temperatures above 60° C., or at low relative humidity. According to methods of the invention, sulfonated poly(phenylene sulfide) (SPPS) films may be provided with a wide range of physical properties, which depend in part on the ion exchange capacity of the films. In particular, the degree or level of sulfonation can be tailored by adjusting reaction conditions such as temperature and time. In a preferred embodiment, an ionomer comprising perfluorosulfonic acid polymer is imbibed into the insoluble SPAS films by immersing the films in a solution or dispersion of the ionomers.

18 Claims, 1 Drawing Sheet

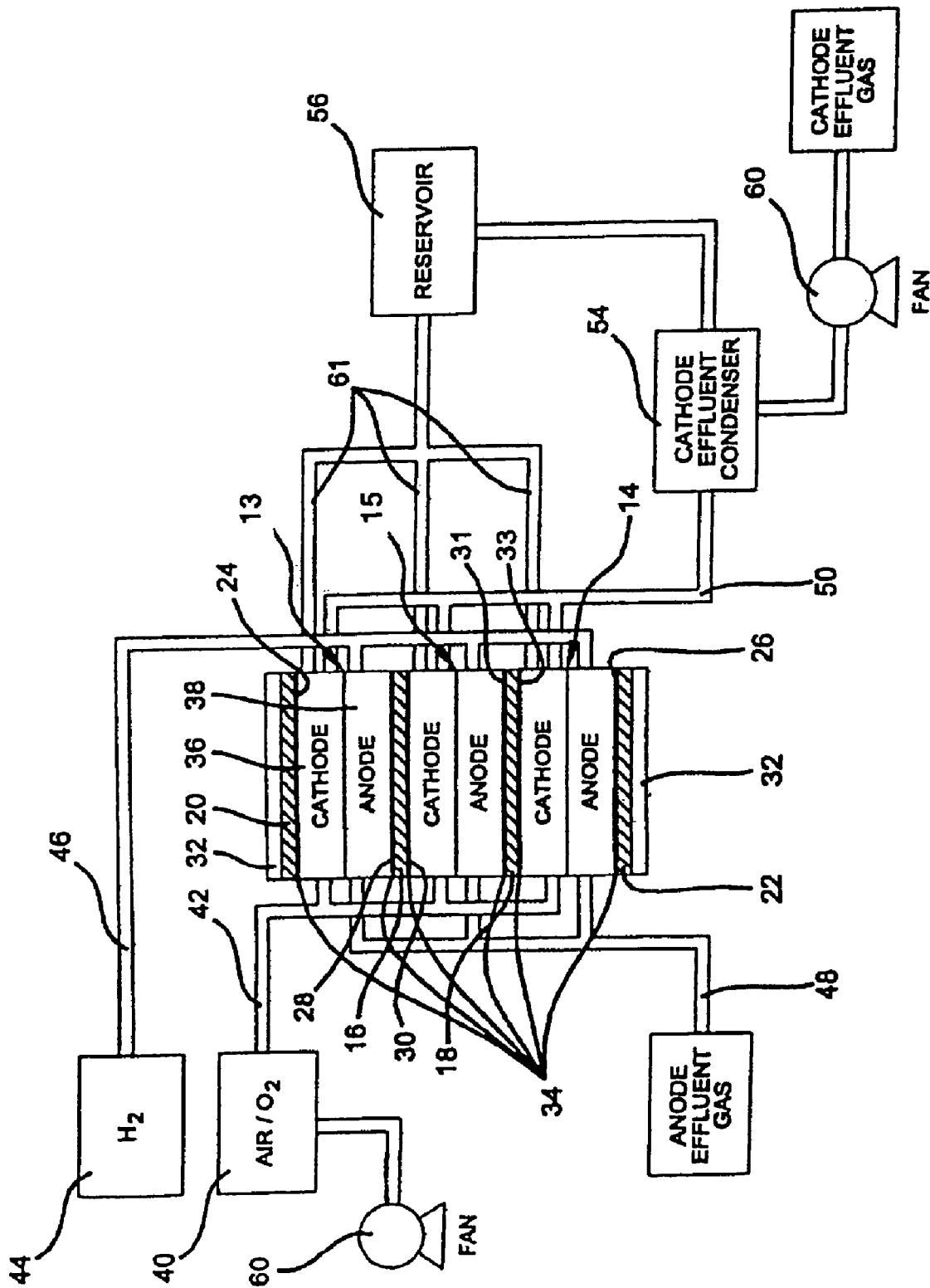

SULFONATED POLYELECTROLYTE MEMBRANES CONTAINING PERFLUOROSULFONATE IONOMERS

INTRODUCTION

The present invention relates to polyelectrolyte membranes and their use as proton exchange membranes in fuel cells. More particularly, the invention relates to treatment of poly(phenylene sulfide) films to provide a polyelectrolyte for fuel cell applications.

Fuel cells are increasingly being used as power sources for electric vehicles and other applications. An exemplary fuel cell has a membrane electrode assembly with catalytic electrodes and a membrane formed between the electrodes. Hydrogen fuel is supplied to the anode side of the assembly, while oxygen is supplied to the cathode. The membrane provides an electrical connection between the anode and cathode, and provides a medium through which fuel oxidation products are transported from the anode to combine with the reduced oxygen at the cathode. The overall reaction in the fuel cell is the combination of hydrogen and oxygen to yield water and an electromotive potential. Because the oxidation product of the fuel is essentially $H^+$ or a proton, the polyelectrolyte membrane is also known as a proton conducting membrane or a proton exchange membrane (PEM).

Water management is important in a PEM fuel cell. A proton must be hydrated to pass through the proton exchange membrane to combine with oxygen at the cathode. According to various models, 7 to 11 water molecules are needed to account for the transport of one proton through the membrane. It has been observed that when relative humidity in the fuel cell is low, proton transport is less efficient and the current available from the cell is reduced. To avoid this, it is possible to humidify fuel cells to prevent the membranes from drying out. However, as temperature of fuel cell operation increases, pressurization may be necessary which leads to added expense.

PEM fuel cells operate at temperatures up to about 95° C. with external humidification at elevated pressures being required to maintain proton conductivity. As the membranes dry out at reduced humidity, proton conductivity deteriorates rapidly.

The industry is constantly looking for new membrane materials that conduct protons efficiently at reduced humidity levels and over a wide range of temperature and humidity conditions. It would further be desirable to provide membranes for PEM fuel cells with improved cost and durability characteristics.

SUMMARY

New proton conducting membranes are made of sulfonated poly(arylene sulfide) polymers (SPAS) and a perfluorosulfonic acid polymer. A preferred poly(arylene sulfide) polymer is poly(p-phenylene sulfide). The membranes are used as a proton exchange membrane in PEM fuel cells operating at temperatures above 95° C., or at low relative humidity. According to methods of the invention, sulfonated poly(phenylene sulfide) (SPPS) films may be provided with a wide range of physical properties, which depend in part on the ion exchange capacity of the films. In particular, the degree or level of sulfonation can be tailored by adjusting reaction conditions such as temperature and time. In a preferred embodiment an ionomer comprising, perfluorosulfonic acid polymer is imbibed into the insoluble SPAS films by immersing the films in a solution or dispersion of the ionomers.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic illustration of three cells in a stack in an exemplary fuel cell system;

DETAILED DESCRIPTION OF THE PREFERRED EMBODIMENTS

The following description of the preferred embodiment(s) is merely exemplary in nature and is in no way intended to limit the invention, its application, or uses.

In one embodiment, the invention provides a polyelectrolyte membrane for use as a proton exchange membrane in a fuel cell. The polyelectrolyte membrane comprises a blend of perfluorosulfonic acid polymer (ionomer) and an insoluble sulfonated poly(arylene sulfide). The membrane is provided in film form. In various embodiments, the membrane contains from about 8 to about 50% dry weight of the ionomer. Preferably, the ionomer is a copolymer of tetrafluoroethylene and a perfluorosulfonic acid monomer. The insoluble sulfonated poly(arylene sulfide) film is preferably prepared by immersing a poly(arylene sulfide) film into a solution of a sulfonating agent such as chlorosulfonic acid, followed by a hydrolyzing the reaction product.

In another embodiment, the invention provides a method for preparing a polyelectrolyte membrane. The method comprises immersing an extruded poly(arylene sulfide) film in a solution containing a halosulfonating reagent for a time and at a temperature sufficient to form a halosulfonated film. Then the halosulfonated film is exposed to water to form an insoluble sulfonated poly(arlene sulfide) film. The sulfonated film is then imbibed with particles of perfluorosulfonic acid polymer (ionomer, also referred to as PFSA). In a preferred embodiment, the halo sulfonated agent comprises chlorosulfonic acid. Conveniently, imbibing the ionomer into the film may be accomplished by immersing the insoluble film into a dispersion of the ionomer. The concentration of ionomer in the dispersion may be varied according to the desired properties of the film, but typically ranges from about 10 to about 15% by weight ionomer. In preferred embodiments, the poly(arylene sulfide) film is sulfonated to achieve an ionic exchange capacity of at least about 0.64 milliequivalent per gram.

The invention also provides a membrane electrode assembly comprising a catalytic anode, a catalytic cathode, and a proton exchange membrane disposed between and in contact with the electrodes. The proton exchange membrane is a polyelectrolyte film such as discussed above. The invention further provides fuel cells containing these membrane electrode assemblies.

Fuel cells of the invention contain an anode, a cathode, and a polyelectrolyte membrane disposed between the anode and the cathode. The fuel cells further comprise inlets for hydrogen fuel gas adjacent the anode and inlets for oxygen gas adjacent the cathode. The polyelectrolyte membrane is a composite made of a sulfonated insoluble poly(arylene sulfide) and a perfluorosulfonic acid polymer. In various embodiments, the polyelectrolyte membrane comprises particles of ionomer imbibed into an insoluble sulfonated poly(arylene sulfide) film. Preferably from about 8 to about 50% by weight (dry) of the PFSA ionomer is imbibed into the film. The perfluorosulfonic acid polymer ionomer has, in various embodiments, an equivalent weight from about 800 to about 1100. Typically, the ionomer is made of a copolymer of tetrafluoroethylene and a perfluorinated sulfonic acid monomer.

The proton exchange polyelectrolyte membranes of the invention are based on sulfonated polymers. Suitable sulfonated polymers include those prepared by sulfonating a polymer represented by formula (I)

$$—[Ar—SO_x]_n— \quad (1)$$

wherein Ar represents a divalent aromatic unit and x is an integer from 0 to 2. When x is 1, the polymers may also be described as poly(arylene) sulfoxide. When x is 2, the polymers may be described as poly(arylene) sulfonyl polymers. Preferably x is 0, where the polymers are poly(arylene sulfide) polymers, or PAS. Formula (1) represents polymers that are made of alternating aromatic and sulfur containing units. Non-limiting examples of the divalent aromatic unit represented by Ar include any of formulas (2)-(11)

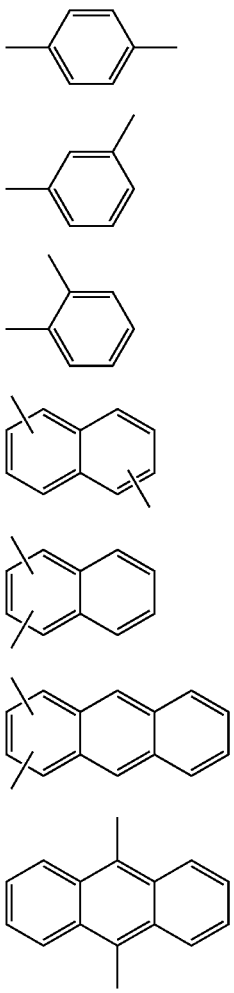

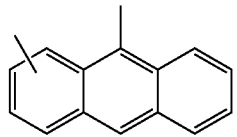

(9)

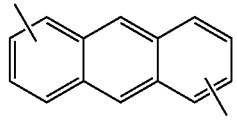

(10)

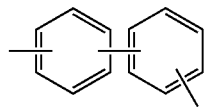

(11)

Preferably Ar is a divalent phenylene unit represented by the formulas (2)-(4) and x is 0 in formula (1).

A preferred poly(arylene sulfide) polymer is poly(p-phenylene sulfide), also known as PPS. PPS has an idealized structure according to the formula

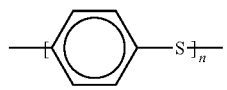

The poly(arylene sulfides) in general and PPS in particular can be prepared by reacting a polyhalogenated arylene compound with a source of sulfur. In one embodiment, a PPS polymer can be formally represented as the reaction product of a para-dihalobenzene such as para-dichlorobenzene and a source of sulfide such as sodium sulfide. To make PPS and other members of the PAS class of polymers other polyhalogenated aromatics can be substituted for the para-dihalobenzenes, and other sources of sulfur can be substituted for the sodium sulfide. Non-limiting examples of halogenated aromatics include para-dichlorobenzene; para-diodobenzene; 1-chloro-4-bromobenzene; 1-chloro-4-iodobenzene; 2,5-dichlorotoluene; 2,5-dichloro-p-xylene; 1-ethyl-4-isopropyl-2,5-dibromobenzene; 1,2,4,5-tetramethyl-3,6-dichlorobenzene; 1-butyl-4-cyclohexyl-2,5-difluorobenzene, and the like.

Mixtures of para- and meta-dichlorobenzene may be used with a source of sulfide to prepare poly(arylene sulfide) useful to make the polyelectrolyte membranes of the invention. In other embodiments, small amounts of 1,2,4-trihaloarylenes, such as 1,2,4-trichlorobenzene may be used. Use of small amounts of the tri-substituted arylenes introduces some branching into the polymeric structure. It is also possible to produce random copolymers containing paraphenylene sulfide and alkyl substituted phenylene sulfides.

Some commercially available poly(arylene sulfide) polymers are sold under the Ryton® PPS trade name by Chevron-Phillips. A variety of molecular weights is available, for example ranging from about 18,000, and n=230 up to about 35,000. As is known in the art, the poly(p-phenylene sulfide) structure has limited solubility except at elevated temperatures in high boiling solvents. It is also known that substituting part of the para-dihalobenzene with other substituted aromatics such as described above can result in amorphous material, and in materials that are more soluble. As discussed above, small amounts of other aromatics may be substituted for para-dihalobenzenes to make the poly(arylene sulfides) of the invention, as long as the desirable solubility properties are not adversely affected.

Because PAS and PPS have limited solubility in most solvents, it is difficult or impossible to produce solution cast films. However, the polymers are melt processable, so that extruded films can be produced. Non-limiting examples of extruded films include 0.5 mil and 1 mil films of PPS. PPS is insoluble in concentrated sulfuric acid, but readily disperses in oleum (fuming sulfuric acid consisting of 30% by weight $SO_3$ in sulfuric acid) and in chlorosulfonic acid ($ClSO_3H$). The reaction with oleum leads to highly sulfonated polymers that are soluble in water, while reaction with $ClSO_3H$ leads to the insoluble SPPS of the invention.

Membranes of the invention can be made by first sulfonating a PAS film and then imbibing PFSA molecules into the sulfonated PPS film. The resulting film generally has the good low humidity properties of a PFSA membrane along with the improved high humidity performance of the hydrocarbon films. Sulfonation of PAS films is described below and in U.S. Application publication No. 2004/0072045, the disclosure of which is herein incorporated by reference. PAS reacts with chlorosulfonic acid to introduce the chlorosulfonyl group ($-SO_2Cl$) onto aromatic rings of the polymers. The polymer-bound chlorosulfonyl groups are subsequently converted to sulfonic acid groups upon hydrolysis, for example by exposing the sulfonated films to boiling water for one hour. The products derived from reaction with the chlorosulfonic acid are insoluble. This is believed to be due in part to a crosslinking reaction involving the formation of sulfone groups ($-SO_2-$). The crosslinking provides advantages for the chlorosulfonation of preformed PPS films, because the crosslinking reaction reinforces physical properties and prevents the films from dissolving in water.

In various embodiments, a PAS film is sulfonated by reacting an extruded PAS film with $ClSO_3H$ or other suitable halosulfonating agent. In a non-limiting example, preformed films of PAS are immersed in a solution of chlorosulfonic acid in a solvent such as dichloromethane or 1,2-dichloroethane. Immersion occurs for a time and at a temperature sufficient to incorporate a desired amount of sulfonate or chlorosulfonyl groups onto the aromatic rings of the polymer. In one embodiment, at least 0.64 meq/g $SO_3H$ is incorporated. After immersing the film in the chlorosulfonic solution for a sufficient time, the film is thereafter exposed to water. This step converts the chlorosulfonyl groups to sulfonic acid groups by hydrolysis. The hydrolysis step may be may be carried out at elevated temperatures, such as in boiling water, to provide faster reaction kinetics.

After hydrolysis, the amount of sulfonic acid groups incorporated into the film can be determined by conventional means, such as titration with sodium hydroxide to a pH of 7. The number of mL of sodium hydroxide solution required to titrate the film to a pH of 7 is converted into meq $SO_3H$/g of film by conventional methods. The value of meq $SO_3H$/g determined by titration techniques is also referred to as the ion exchange capacity (IEC) of the film.

The polyelectrolyte membranes contain perfluorosulfonic acid polymer ionomer solution blended into an insoluble sulfonated poly(arylene sulfide) film. Suitable ionomers include perfluorosulfonic acid polymers such as those sold under the Nafion® (DuPont) and Aciplex® (Asahi Kasei Corporation) tradenames. Chemically, they are based on polymers and copolymers of perfluorosulfonic acid monomers. In a preferred embodiment, the ionomers contain a polymerized tetrafluoroethylene backbone on which side chains containing perfluorinated vinyl ether are bonded by oxygen atoms. Sulfonic acid groups on the side chain give the polymer a cation exchange capability. The proton exchange capacity of the ionomers is measured by its equivalent weight, or the mass per active sulfonic acid group. Commercially available perfluorosulfonic acid polymers are available with equivalent weights from about 800 to about 1100.

In a preferred embodiment, the perfluorinated sulfonic acid polymers can be represented by the formula

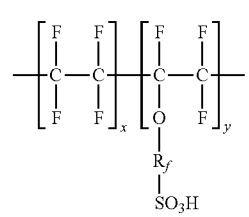

(12)

where $R_f$ represents a perfluoroalkylene or perfluorooxyalkylene group, and x and y the relative proportion of perfluoromonomer and sulfonated monomer respectively, in the polymer. The equivalent weight of the polymer is determined in part by the relative ratio of x and y, and in part by the relative size of the connecting group $R_f$. Two commercial embodiments are given by the formulas (13) and (14)

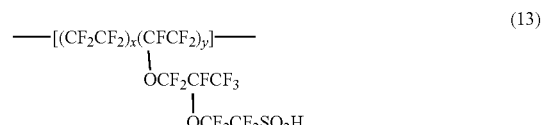

(13)

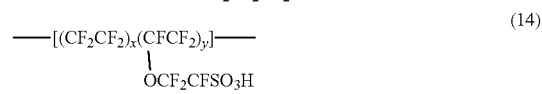

(14)

Formula (13) represents a "long chain" perfluorosulfonic acid polymer, while (14) represents a "short chain" polymer. In general, higher equivalent weights may be attained by using the short chain polymers. The perfluorosulfonic acid polymers are referred to as ionomers.

Dispersions of suitable ionomers or perfluorosulfonic acid polymers are commercially available. Suitable dispersions for use in preparing the electrolyte membranes of the invention contain from about 5 to about 20% by weight of the perfluorosulfonic acid polymer. Higher concentrations may be used as well. The products are provided as dispersions in water or in water plus up to about 50% of a volatile organic component such as 1-propanol. Suitable commercial polymer dispersions are sold by DuPont under the Nafion® tradename, and by Asahi Kasei Corporation under the Aciplex® trade name.

Polyelectrolyte membranes of the invention are made by combining perfluorosulfonic acid polymers and an insoluble sulfonated poly(arylene sulfide) film. In a preferred embodiment, the membranes can be made by immersing the sulfonated poly(arylene sulfide) film into a solution or dispersion containing the perfluorosulfonic acid ionomer. The ionomer is present as aggregates in the form of particles and the like, or as separate solubilized molecules, depending on the solvent, concentration of ionomer, and other factors. During immersion, the perfluorosulfonic acid ionomer molecules or particles are combined with or imbibed into the structure of the film. The amount of ionomer combined into or imbibed into the film depends on several factors, such as the temperature, the concentration of ionomer in the dispersion, the length of immersion, and others. Preferably, from about 8 to about 50% dry weight of ionomer is combined or imbibed into the film.

After the film is removed from the dispersion, it is generally allowed to drip dry, and then is further dried either at room temperature or at elevated temperature in an oven. If elevated temperature is used, it is preferred to dry at no higher than 100° C., and preferably no higher than 80° C. Preferably, the film is dried while in tension. Tension applied during the drying step tends to smooth out wrinkles and produce a membrane more suitable for use in fuel cells. Tension is applied in a number of ways. In one embodiment, the wet film is laid on a solid surface such as glass. Contact between the film and the glass surface prevents shrinkage during drying and provides tension to keep the film from wrinkling. Alternatively, the film may be held in a tenter frame or similar device while drying. In a preferred embodiment, the wet imbibed film is dried under tension to reduce the thickness of the film. That is, the sulfonated film usually swells noticeably when immersed in the ionomer solution or dispersion to imbibe the PFSA. Tension applied during drying tends to hold the membrane in the swollen dimensions. As the film dries at a larger dimension, the thickness of the film necessarily goes down. In a non-limiting example, the thickness of the film is reduced from 2 mils to about 1 mil by applying tension during the drying step (where 1 mil=0.001 inch=0.00254 cm). To illustrate, the PPS is supplied in a thickness of 2 mil. When the film is sulfonated, the thickness remains approximately the same. But when the ionomer is imbibed, the film swells and the dimensions of the film increase appreciably, depending on the solvent. By applying tension during drying, the length and width are held to their swollen values, with the result that the thickness of the dried film is reduced.

In one aspect, the invention provides composite membranes containing both an ionomer component and a hydrocarbon film component. The ionomer component preferably is made of perfluorosulfonic acid polymers such as the Nafion® and Aciplex® products that are commercially available. The hydrocarbon film component of the membranes of the invention preferably is made up of sulfonated poly (arylene sulfides) as described above. Without being bound by theory, it is believed that the hydrocarbon component of the membranes of the invention contributes to enhanced performance at a relatively high relative humidity, while the presence of the sulfonated or perfluorosulfonic acid ionomers contributes to good performance at relatively low humidity.

In various embodiments, polyelectrolyte membranes of the invention have liquid water conductivity measured in S/cm at 30° C. or 100° C. comparable to that of conventional perfluorosulfonic acids used as proton exchange membranes in fuel cells. For example, the commercially available proton exchange membrane, Nafion 112 from DuPont exhibits a liquid conductivity at 30° C. of 0.095 S/cm at 30° C. and 0.186 S/cm at 100° C. Such conductivity measurements may be made as described by Zawodzinski et al., J. Phys. Chem. 95 (15) 6040 (1991). The membrane is conditioned in 100° C. water for 1 hour and the measurement cell is submerged in 25° C. deionized water during the experiment. The membrane impedance (real) is taken at zero imaginary impedance.

According to another embodiment of the invention, a fuel cell is provided that contains the sulfonated PAS/PFSA composite as a proton exchange membrane. Such fuel cells typically contain a membrane electrode assembly (MEA) containing a catalytic anode, a catalytic cathode, and a proton exchange membrane disposed between the anode and cathode, where the proton exchange membrane is the sulfonated ionomer imbibed polymers described above. The MEAs are constructed according to known methods—such as for example disclosed in Sompalli et al., U.S. Pat. No. 6,524,736—from the membranes of the invention and the respective electrodes. The fuel cell also contains an inlet adjacent the anode for providing hydrogen fuel to the anode side of the fuel cell, and an inlet adjacent the cathode for providing oxidant gas (oxygen) to the cathode.

Referring generally to FIG. 1, three individual proton exchange membrane (PEM) fuel cells according to one preferred embodiment of the present invention are connected to form a stack. Each PEM fuel cell has membrane-electrode-assemblies (MEA) 13,15,14, respectively, separated from one another by electrically conductive, impermeable separator plates 16,18, and further sandwiched between terminal separator plates 20,22 at each end of the stack with each terminal plate 20,22 having only one electrically active side 24,26. An individual fuel cell, which is not connected in series within a stack, has a separator plate, with only a single electrically active side. In a multiple fuel cell stack, such as the one shown, a preferred bipolar separator plate 16 typically has two electrically active sides 28,30 respectively facing a separate MEA 13,15 with opposite charges that are separated, hence the so-called "bipolar" plate. As described herein, the fuel cell stack has conductive bipolar separator plates in a stack with multiple fuel cells, however the present invention is equally applicable to conductive separator plates within a stack having only a single fuel cell.

The MEAs 13,15,14 and bipolar plates 16,18 are stacked together between aluminum clamping plates 32 at each end of the stack and the end contact terminal plate elements 20,22. The end contact terminal plate elements 20,22, as well as working faces 28,30 and 31,33 of both bipolar separator plates 16,18, contain a plurality of gas flow channels (not shown) for distributing fuel and oxidant gases (i.e., $H_2$ & $O_2$) to the MEAs 13,15,14. Nonconductive gaskets or seals (not shown) provide seals and electrical insulation between the several components of the fuel cell stack. Gas-permeable conductive diffusion media 34 press up against the electrode faces of the MEAs 13,15,14. When the fuel cell stack is assembled, the conductive gas diffusion layers 34 assist in even distribution of gas across the electrodes of the MEAs 13,15,14 and also assist in conducting electrical current throughout the stack.

An inlet for oxygen adjacent the cathode and an inlet for hydrogen adjacent the anode are also provided. Oxygen is supplied to the cathode side 36 of each fuel cell in the stack from storage tank 40 via appropriate supply plumbing 42 to provide an inlet for oxygen adjacent the cathode, while hydrogen is supplied to the anode side 38 of the fuel cell from storage tank 44, via appropriate supply plumbing 46 to provide an inlet for hydrogen adjacent the anode. Alternatively, air may be supplied to the cathode side 36 from the ambient, and hydrogen to the anode 38 from a methanol or gasoline reformer, or the like. Exhaust plumbing for the anode side 48 and the cathode side 50 of the MEAs 13,15,14 are provided. On the cathode side, the plumbing defines an exit side. Gas flow into and out of the stack is typically facilitated by fans 60, such as those shown in the exemplary configuration of FIG. 1. Any means of transporting fluids into and out of the stack are feasible, and the configuration and number of fans shown is merely exemplary and not limiting.

As shown in FIG. 1, the cathode effluent 50 is routed from the stack to a condenser 54, which serves to liquefy and recover the vapors in the cathode effluent stream 50. The liquids (e.g. water) are transported to a reservoir 56 for storage. The effluent stream 50 from the cathode has a high concentration of vapor (water vapor, for example) due to the water generated by the electrochemical reactions occurring within the MEA and any additional water introduced for cooling. The water evaporates due to pressure and temperature conditions within the fuel cell. Preferably, the effluent stream is saturated with vapor (e.g. in the case of water at approximately 100% relative humidity). As shown, the supply conduits 61 provide water to the cathode side of each MEA 13,15,14 by interconnecting the reservoir 56 to the fuel cells in the stack. A pump (not shown) may optionally be included in the system to facilitate the transport of the liquid from the reservoir 56 to the stack, or through other areas of the system.

The invention has been described above with respect to various preferred embodiments. Further non-limiting examples are given in the examples that follow.

EXAMPLES

Example 1

Sulfonation of PPS Films with Chlorosulfonic Acid at 25° C.

Dichloromethane (50 mL, 66 gm) and chlorosulfonic acid (between 0.7 and 1.4 gms) are added sequentially to a wide mouth glass bottle (120 mL capacity, 2 inch diameter). 10 mL of this solution are added to dichloromethane (50 mL, 66 gms) in a wide mouth glass jar (410 mL, 3 inch diameter). To this mixture is added a 1 mil (0.001 inch, 0.0025 cm) colorless film of PPS (Chevron-Phillips) consisting of a circle with a diameter of 2.75 inches and weighing between 0.14 and 0.18 gm. The jar is sealed with a screw cap lid and the film is allowed to react for various amounts of time at 25° C. while being suspended in the reaction solution. The insoluble colorless film is observed to turn blue-green and then black after several seconds of immersion in the reaction solution. After a variable time of reaction, the black film is then added to distilled water (200 mL) and the film turned light yellow. The film is washed extensively with more water (about 2 liter) and then boiled in water (250 mL) for about 1 hour. The film is then suspended in 1 molar sodium chloride (220 mL) and the amount of sulfonation is determined by titration with 0.01 molar sodium hydroxide to a pH 7 end point. The amount of sulfonation (in meq/g $SO_3H$) with reaction time is 0.64 (1 hour), 1.27 (6.5 hours), 1.71 (16 hours), 1.86 (24 hours), 2.31 (48 hours), and 2.6 (60 hours). The sulfonated film with 1.9 meq/g $SO_3H$ had a proton conductivity of 0.079 and 0.204 S/cm at 33° C. and 100° C. respectively.

Example 2

Sulfonation Reaction at 40° C.

The reaction described above is repeated at 40° C. After 4 hours, the amount of sulfonation is determined by titration with 0.01 molar sodium hydroxide to be 2.36 meq/g $SO_3H$. The physical properties of the film are better than those with membranes having similar ion exchange capacities made at 25° C.

Example 3

SPPS Imbibed with PFSA Ionomer

Ryton 16 C (a 2 mil polyphenylene sulfide film of Chevron-Philips) is sulfonated at 2.3 meq $SO_3H$/g (SPPS). The sulfonated film is immersed at room temperature in an aqueous 1-propanol solution or dispersion of Asahi Kasei Aciplex® 910/05SS (containing 4-6 wt. % of PFSA of equivalent weight 910) for a few seconds until the immersed film stops visible swelling. It is then spread out on a piece of glass and then dried at room temperature. The dried film has a thickness of about 1 mil. The uptake of PFSA by the film is about 13% by weight. The resultant SPP-PFSA composite membrane displays proton conductivity that is about one-half that of Nafion 112 at 50% relative humidity (rh), while the conductivity at high rh is higher than that of Nafion 112. The crossover point for the respective conductivity curves for the Nafion 112 and the SPPS-PFSA blend is at about 70% rh.

Example 4

A 50-cm² fuel cell is built with the SPPS-PFSA membrane of Example 3 using catalyst coated diffusion media. A polarization curve measured on the cell shows improved performance over a cell with an untreated membrane, in that higher DC voltages are achieved at specific current densities. Here the "untreated membrane" is the product of sulfonation of the poly(arylene sulfide) to the same IEC (2.3 meq tSO3H/g), but without PFSA being imbibed into the film.

Although the invention has been described above with respect to various preferred embodiments, it is to be understood that scope of the invention is not limited to the embodiments disclosed. Variations and modifications as will occur to those of skill in the art upon reading the disclosure are also included in the scope of the invention, which is defined only by the appended claims.

What is claimed is:

1. A fuel cell comprising a polyelectrolyte membrane for use as a proton exchange membrane wherein the membrane comprises a blend of perfluorosulfonic acid polymer and an insoluble sulfonated polymer in film form, wherein the sulfonated polymer is produced by sulfonating a polymer represented by the structure

(1)

wherein Ar represents a divalent aromatic unit and x is an integer from 0 to 2.

2. A fuel cell according to claim 1, wherein x is 0.

3. A fuel cell according to claim 2, wherein Ar is selected from

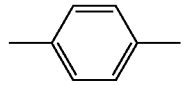

(2)

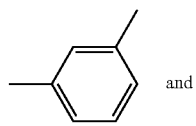

(3)

and

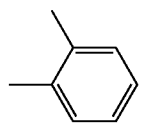

(4)

4. A fuel cell according to claim 1, wherein the membrane comprises about 8 to about 50% dry weight of the perfluorosulfonic acid polymer.

5. A fuel cell according to claim 1, wherein the perfluorosulfonic acid polymer is a copolymer of tetrafluoroethylene and a perfluorosulfonic acid monomer.

6. A fuel cell according to claim 1, wherein the insoluble sulfonated polymer is made by a process comprising immersing a film of poly(arylene sulfide) in a solution of chlorosulfonic acid to form an intermediate containing chlorosulfonyl groups and hydrolyzing the chlorosulfonyl groups.

7. A fuel cell according to claim 6, wherein hydrolyzing comprises exposing the intermediate to boiling water.

8. A fuel cell according to claim 1, wherein the membrane comprises perfluorosulfonic acid polymer imbibed into a film of sulfonated poly(arylene sulfide).

9. A fuel cell according to claim 8, wherein the poly (arylene sulfide) comprises polyphenylene sulfide.

10. A fuel cell comprising,
    an anode;
    a cathode;
    a proton exchange membrane disposed between the anode and the cathode;
    an inlet for hydrogen adjacent the anode; and
    an inlet for oxygen adjacent the cathode,
wherein the proton exchange membrane is a composite comprising an insoluble sulfonated poly(arylene sulfide) and a perfluorosulfonic acid polymer.

11. A fuel cell according to claim 10, wherein the proton exchange membrane comprises particles of perfluorosulfonic acid imbibed into an insoluble sulfonated poly(arylene sulfide) film.

12. A fuel cell according to claim 11, wherein the proton exchange membrane comprises from about 8 to about 50% dry weight of perfluorosulfonic acid polymer.

13. A fuel cell according to claim 12, wherein the proton exchange membrane has an ion exchange capacity of 0.64 to 5.

14. A fuel cell according to claim 10, wherein the poly (arylene sulfide) comprises polyphenylene sulfide.

15. A fuel cell according to claim 10, wherein the proton exchange membrane comprises sulfone cross-links.

16. A fuel cell according to claim 10, wherein the perfluorosulfonic acid polymer has an equivalent weight of from about 800 to about 1100.

17. A fuel cell according to claim 10, wherein the perfluorosulfonic acid comprises a copolymer of tetrafluoroethylene and

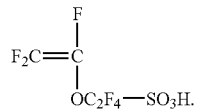

18. A fuel cell according to claim 10, wherein the perfluorosulfonic acid comprises a copolymer of tetrafluoroethylene and

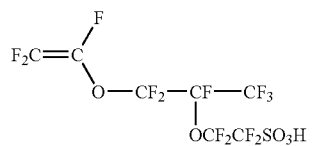

* * * * *